US011293505B2

(12) United States Patent
Barbosa

(10) Patent No.: US 11,293,505 B2
(45) Date of Patent: Apr. 5, 2022

(54) UNI-DIRECTIONAL ANTI-ROTATION MEMBER FOR A DISC BRAKE ASSEMBLY WITH AN ELECTRIC PARKING BRAKE

(71) Applicant: ZF Active Safety US Inc., Livonia, MI (US)

(72) Inventor: Manuel Barbosa, Novi, MI (US)

(73) Assignee: ZF Active Safety US Inc., Livonia, MI (US)

( * ) Notice: Subject to any disclaimer, the term of this patent is extended or adjusted under 35 U.S.C. 154(b) by 47 days.

(21) Appl. No.: 16/958,791

(22) PCT Filed: Dec. 26, 2018

(86) PCT No.: PCT/US2018/067488
§ 371 (c)(1),
(2) Date: Jun. 29, 2020

(87) PCT Pub. No.: WO2019/133596
PCT Pub. Date: Jul. 4, 2019

(65) Prior Publication Data
US 2020/0332849 A1    Oct. 22, 2020

Related U.S. Application Data

(60) Provisional application No. 62/610,968, filed on Dec. 28, 2017.

(51) Int. Cl.
*F16D 55/02*  (2006.01)
*F16D 65/18*  (2006.01)
(Continued)

(52) U.S. Cl.
CPC .......... *F16D 65/18* (2013.01); *F16D 65/0979* (2013.01); *F16D 2055/0016* (2013.01);
(Continued)

(58) Field of Classification Search
CPC .... F16D 65/095; F16D 65/18; F16D 65/0979; F16D 2125/06; F16D 2125/40; F16D 2125/34
See application file for complete search history.

(56) References Cited

U.S. PATENT DOCUMENTS 4,207,970 A  *  6/1980  Shimizu ............... F16D 55/227
188/71.9
5,366,053 A     11/1994  Yant
(Continued)

FOREIGN PATENT DOCUMENTS

KR    1020060033354       4/2006
WO    WO-2017150449 A1 *  9/2017  ............ F16D 65/18

OTHER PUBLICATIONS

Machine translation of WO 2017/150449 (no date).*

*Primary Examiner* — Nicholas J Lane
(74) *Attorney, Agent, or Firm* — Robert James Harwood

(57) ABSTRACT

A disc brake assembly includes a brake shoe, an anti-rotation member extending outward from the brake shoe, a displaceable brake piston that supports the brake shoe, an end face of the brake piston, and a recessed area in the end face. The brake shoe is displaceable along an axis. The end face is perpendicular to the axis and faces the brake shoe. The anti-rotation member has a stop surface and a diversion surface. The recessed area engages the stop surface to stop rotation of the brake piston in a first direction and the recessed area engages the diversion surface to allow rotation of the brake piston in a second direction. The first and second directions are opposite.

18 Claims, 15 Drawing Sheets

(51) Int. Cl.
*F16D 65/097* (2006.01)
*F16D 55/00* (2006.01)
*F16D 123/00* (2012.01)
*F16D 125/06* (2012.01)
*F16D 125/40* (2012.01)

(52) U.S. Cl.
CPC ...... *F16D 2123/00* (2013.01); *F16D 2125/06* (2013.01); *F16D 2125/40* (2013.01)

(56) References Cited

U.S. PATENT DOCUMENTS

| | | | |
|---|---|---|---|
| 6,431,329 B1 | 8/2002 | Huber, Jr. et al. | |
| 2013/0261890 A1 | 10/2013 | Roberts et al. | |
| 2014/0158480 A1* | 6/2014 | Qian | F16D 55/226 |
| | | | 188/72.6 |
| 2017/0321771 A1* | 11/2017 | Lee | F16D 55/226 |
| 2018/0094682 A1* | 4/2018 | Satoh | F16D 65/092 |

* cited by examiner

UNI-DIRECTIONAL ANTI-ROTATION MEMBER FOR A DISC BRAKE ASSEMBLY WITH AN ELECTRIC PARKING BRAKE

CROSS REFERENCE TO RELATED APPLICATIONS

This application is a national stage of International Application No. PCT/US18/067488, filed Dec. 26, 2018, the disclosure of which is incorporated herein by reference in its entirety, and which claimed priority to U.S. Provisional Patent Application No. 62/610,968, filed Dec. 28, 2017, the disclosure of which is incorporated herein by reference in its entirety.

BACKGROUND OF INVENTION

This invention relates in general to vehicle disc brake assemblies and in particular to an improved anti-rotation member for use with a parking brake function of such a disc brake assembly.

A typical disc brake assembly for a vehicle includes a brake disc which is secured to a wheel of the vehicle for rotation therewith and non-rotating brake linings that are operable between non-braking and braking positions. Each of the brake linings is supported on a brake shoe. In the non-braking position, the brake linings do not slow rotation of the brake disc. In the braking position, the brake linings are in frictional engagement with the brake disc to slow rotation of the brake disc. The brake linings are moved into frictional engagement with the brake disc by a brake piston and a sliding caliper of the disc brake assembly. For example, hydraulic pressure may linearly actuate the brake piston to displace the brake linings to frictionally engage the brake disc and provide braking. Typically, the brake piston displaces an inboard brake lining directly and an outboard brake lining via the caliper.

The disc brake assembly may also provide a parking brake function by first moving the brake linings into the braking position and then using an electric parking brake (EPB) to support the brake piston. The EPB may comprise a rotationally restrained spindle nut threaded onto a spindle driven by an electric motor. As the spindle is rotationally driven, the spindle nut axially translates to support the brake piston on the brake linings in the braking position. An end face of the brake piston contacts one of the brake shoes to support the brake linings in the braking position.

When the end face contacts the brake shoe, torque from the motor is transferred to the end face. The brake piston may rotate or spin when friction between the end face and the brake shoe is insufficient to resist the torque. The brake shoe typically has a backing plate which the brake lining is supported on and the end face contacts. To stop rotation of the brake piston, an anti-rotation member, in the form of an outwardly protruding pip, is provided on the backing plate. Rotation of the brake piston is positively prevented when the pip engages a recessed area—e.g., notch—provided in the end face. However, the pip must be properly aligned with the recessed area during manufacturing of the disc brake assembly. Otherwise, caliper drag, damage to the end face, damage to the brake lining, noise, premature wear of the brake lining, and/or tapered wear of the brake lining may result. This alignment requirement increases complexity and reduces efficiency for manufacturing the disc brake assembly.

Furthermore, for servicing of the caliper, the motor is operated in reverse until the spindle contacts a spindle stop. When the spindle contacts the spindle stop, the brake piston will spin because there is no friction between the end face and the brake shoe to stop the spinning. The spinning brake piston may strike the pip on the backing plate. This impact may damage the spindle. Therefore it would be desirable to have a disc brake assembly with an anti-rotation member that is more efficient to manufacture and also reduces damage and/or wear.

SUMMARY OF INVENTION

This invention relates to an anti-rotation member of a disc brake assembly for a parking brake function.

According to one embodiment, a disc brake assembly may comprise, individually and/or in combination, one or more of the following features: a brake shoe displaceable along an axis, an anti-rotation member extending outward from the brake shoe and having a stop surface and a diversion surface, a displaceable brake piston that supports the brake shoe, an end face of the brake piston perpendicular to the axis and facing the brake shoe, and a recessed area in the end face. The recessed area engages the stop surface to stop rotation of the brake piston in a first direction and the recessed area engages the diversion surface to allow rotation of the brake piston in a second direction. The first and second directions are opposite.

According to this embodiment, the diversion surface deflects towards the brake shoe when engaged by the recessed area.

According to this embodiment, a spring force returns the diversion surface away from the brake shoe when the recessed area disengages the diversion surface.

According to this embodiment, the stop surface deflects with the diversion surface.

According to this embodiment, the anti-rotation member deflects towards the brake shoe when the diversion surface is engaged by the recessed area.

According to this embodiment, the anti-rotation member is connected to the brake shoe by a bend portion that biases the anti-rotation member away from the brake shoe.

According to this embodiment, the disc brake assembly may further comprise a first distance from the brake shoe to the diversion surface and a second distance from the brake shoe to the diversion surface. The first and second distances are parallel to the axis. The first distance is greater than the second distance. The first distance is between the stop surface and the second distance.

According to this embodiment, the stop surface is a first plane parallel to the axis and the diversion surface is a second plane transverse to the axis.

According to this embodiment, the diversion surface is a curved surface.

According to this embodiment, the diversion surface has a varying radius.

According to this embodiment, the anti-rotation member extends from a backing plate of the brake shoe.

According to this embodiment, the anti-rotation member extends from a shim of the brake shoe.

According to this embodiment, the recessed area is recessed into the end face away from the brake shoe.

According to this embodiment, rotation of the brake piston in the first direction positions the brake piston to support the brake shoe and rotation of the brake piston in the second direction displaces the brake piston away from the brake shoe.

According to this embodiment, the disc brake assembly may further comprise a spindle nut displaceable along the axis to support the brake piston on the brake shoe, a spindle upon which the spindle nut is threaded, and a drive assembly that rotates the spindle to displace the spindle nut along the axis.

According to another embodiment, a disc brake assembly may comprise, individually and/or in combination, one or more of the following features: a brake shoe displaceable along an axis, an anti-rotation member extending outward from the brake shoe and having a stop surface and a diversion surface, a displaceable brake piston that supports the brake shoe, an end face of the brake piston perpendicular to the axis and facing the brake shoe, and a recessed area in the end face. The recessed area engages the stop surface to stop rotation of the brake piston in a first direction and the recessed area engages the diversion surface to allow rotation of the brake piston in a second direction. The first and second directions are opposite. The anti-rotation member deflects towards the brake shoe when the diversion surface is engaged by the recessed area.

According to this embodiment, the anti-rotation member is biased away from the brake shoe.

According to another embodiment, a disc brake assembly may comprise, individually and/or in combination, one or more of the following features: a caliper having a cavity, inboard and outboard brake shoes displaceable along an axis, brake linings mounted to the inboard and outboard brake shoes, a brake piston mounted in the cavity for displacing the inboard and outboard brake shoes and supporting the inboard brake shoe, an end face of the brake piston perpendicular to the axis and facing the inboard brake shoe, a recessed area in the end face, and an anti-rotation member extending outward from the inboard brake shoe and having a stop surface and a diversion surface. The recessed area engages the stop surface to stop rotation of the brake piston in a first direction and the recessed area engages the diversion surface to allow rotation of the brake piston in a second direction. The first and second directions are opposite.

According to this embodiment, the diversion surface deflects towards the inboard brake shoe when engaged by the recessed area.

According to this embodiment, the disc brake assembly may further comprise a spindle nut displaceable along the axis to support the brake piston on the inboard brake shoe, a spindle upon which the spindle nut is threaded, and a drive assembly that rotates the spindle to displace the spindle nut along the axis.

An advantage of an embodiment is more efficient manufacturing of the disc brake assembly. A further advantage of an embodiment is reduced wear and/or damage of the disc brake assembly. Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
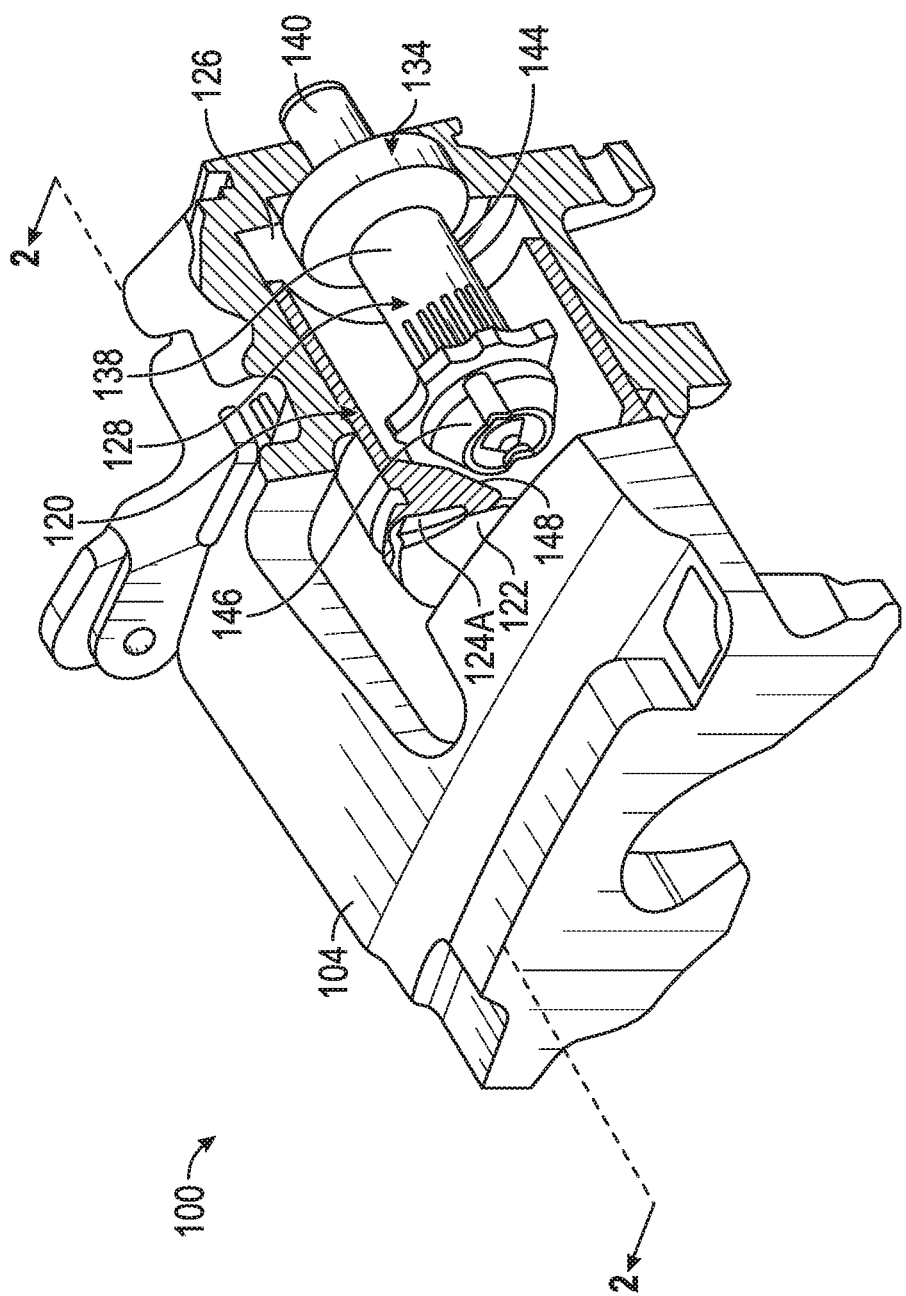
FIG. 1 is a sectional perspective view of a disc brake assembly having a prior art anti-rotation member for an electric parking brake.
Figure 2:
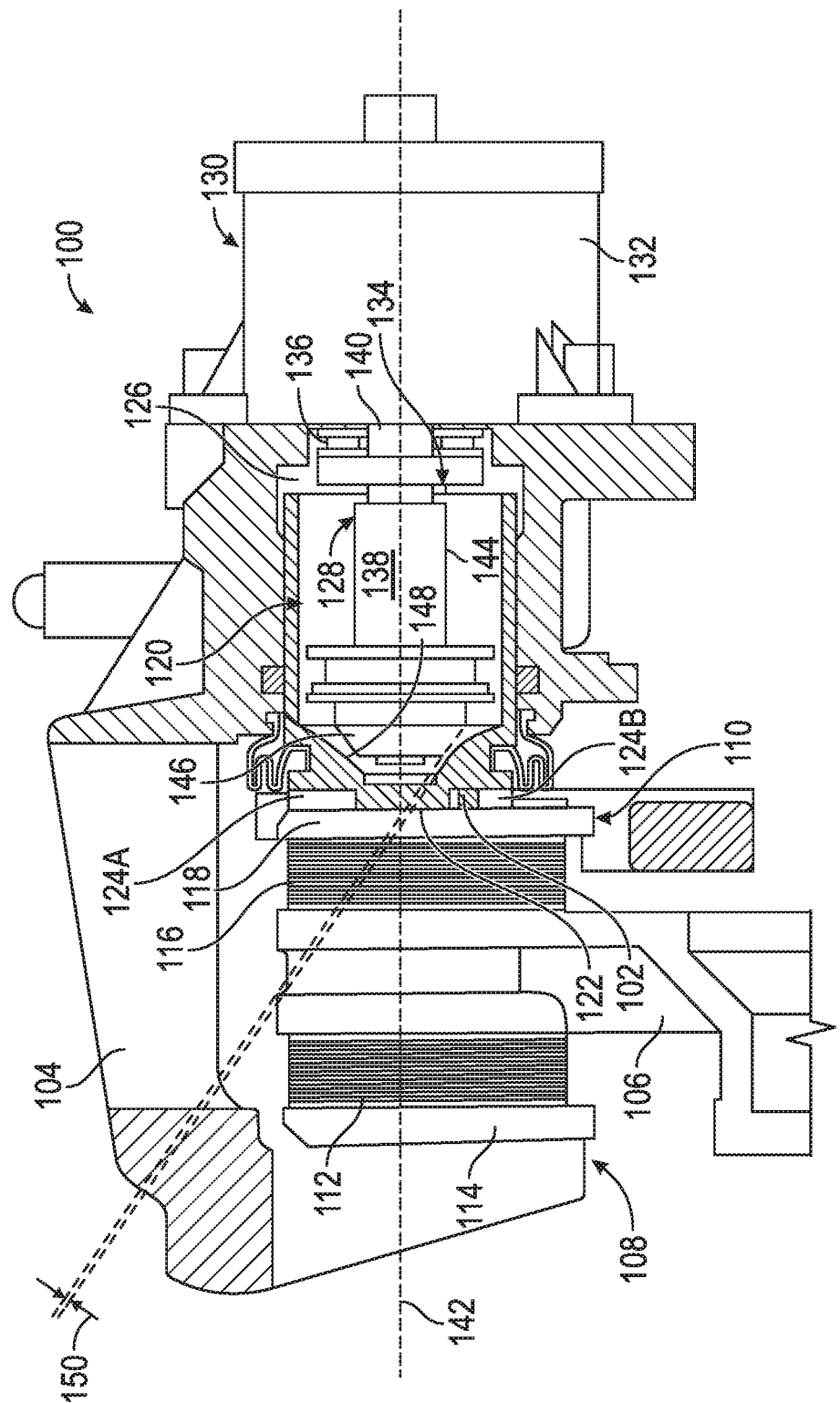
FIG. 2 is a sectional view taken along line 2-2 of FIG. 1.

Referring now to FIGS. 1 and 2, there is illustrated a disc brake assembly, indicated generally at 100, having a prior art anti-rotation member in the form of a pip 102. The general structure and operation of the disc brake assembly 100 is well known in the prior art. For example, the disc brake assembly 100 may be such as is disclosed by U.S. Pat. No. 8,844,683 to Sternal et al., U.S. Patent Application Publication No. 2017/0261053 to Schaefer et al., or U.S. Patent Publication No. 2018/0087589 to Gerber et al, the disclosures of all of which are hereby incorporated by reference in entirety herein.

The disc brake assembly 100 includes a sliding caliper 104. The caliper 104 is mounted in a floating manner by means of a brake carrier (not shown) in a manner known to those skilled in the art. The caliper 104 also spans a brake disc 106 that is coupled to a vehicle wheel (not shown) in a rotationally fixed manner.

Provided in the caliper 104 are outboard and inboard brake shoes, indicated generally at 108 and 110, respectively. The outboard brake shoe 108 has an outboard brake lining 112 supported on an outboard backing plate 114. Similarly, the inboard brake shoe 110 has an inboard brake lining 116 supported on an inboard backing plate 118. The outboard backing plate 114 bears on the caliper 104 and the inboard backing plate 118 bears on a brake piston 120. The outboard and inboard brake linings 112 and 116, respectively, face towards each other and, in a release position, are disposed with a small air clearance on both sides of the brake disc 106, such that no significant residual drag moments occur on the brake disc 106. The inboard backing plate 118 is disposed between the inboard brake lining 116 and the brake piston 120 such that the inboard brake lining 116 and the brake piston 120 move jointly.

The pip 102 protrudes outwardly from the inboard backing plate 118. The pip 102 will be discussed further with reference to FIGS. 3 and 5. The brake piston 120 has an end face 122. The end face 122 faces the inboard brake shoe 110. Provided in the end face 122 are first and second recessed areas—i.e., notches or pockets—124A and 124B, respectively, for receiving the pip 102. The first and second recessed areas 124A and 124B, respectively, are recessed into the end face 122 away from the inboard brake shoe 110. The first and second recessed areas 124A and 124B, respectively, will be discussed further with reference to FIGS. 4 and 5.

The brake piston 120 is mounted in a movable manner in a preferably cylindrical cavity 126 in the caliper 104. In addition, it can be seen that the brake piston 120 is realized so as to be hollow. Accommodated in the brake piston 120 is a rotationally restrained spindle nut, indicated generally at 128, of an electric parking brake (EPB), indicated generally at 130. The EPB 130 preferably includes a drive assembly 132 having a suitable power source and transmission assembly known to those skilled in the art. As a non-limiting example, the power source may be an electric motor.

A spindle, indicated generally at 134, is operatively connected to the drive assembly 132, supported via an axial bearing 136, and accommodated in a threaded manner in a threaded receiver 138 of the spindle nut 128. An output shaft 140 of the drive assembly 132 rotationally drives the spindle 134. This results in movement of the spindle nut 128 along a longitudinal axis 142 because the spindle nut 128 is rotationally restrained. An external surface 144 of the spindle nut 128 is preferably cylindrical. The inboard and outboard brake shoes 108 and 112, respectively, as well as the brake piston 120, are also displaceable along the longitudinal axis 142.

The spindle nut 128 has a conical portion 146 which can be brought into bearing contact with a complementary conical inner portion 148 of the brake piston 120. In the release position, there is a clearance 150 between the conical portion 146 and the conical inner portion 148. The construction, shape, configuration, and/or make-up of the conical portion 146 and the complementary conical inner portion 148 may be other than as illustrated and described, if so desired. For example, the conical portion 146 and the conical inner portion 148 may have other, non-conical, complimentary shapes.

When service braking is desired for a vehicle having the disc brake assembly 100, the disc brake assembly 100 is hydraulically actuated. For example, the disc brake assembly 100 may be hydraulically actuated by a driver via a brake pedal or via a drive assistance system. When the disc brake assembly 100 is hydraulically actuated, hydraulic fluid is pressurized (by a suitable means known to those skilled in the art) in the cavity 126 such that the brake piston 120 is displaced leftward in FIG. 2 along the longitudinal axis 142. As a consequence, and as is known to those skilled in the art, the inboard brake lining 116 is pressed onto the brake disc 106 by the brake piston 120 (i.e., by the end face 122) and, at the same time, a corresponding displacement of the caliper 104 on an opposite side of the brake disc 106 causes the outboard brake lining 112 to be drawn against the opposite side of the brake disc 106. As a result of the application of the pressurized hydraulic fluid to the cavity 126, the brake piston 120 has been displaced leftward in FIG. 2, along the longitudinal axis 142 towards the brake disc 106 and into an active braking position. The spindle nut 128 remains unactuated, and therefore remains at an initial axial position in FIG. 2.

For activating a parking brake function of the disc brake assembly 100, in a manner similar to service braking, the brake piston 120 is first put into the active braking position through application of hydraulic pressure. Actuation of the EPB 130 then causes the drive assembly 132 to displace the spindle nut 128 towards the brake disc 106 until the clearance 150 has been used up and the conical portion 146 bears on the corresponding conical inner portion 148 inside the brake piston 120. As a result, the brake piston 120 is axially supported, via the spindle nut 128 and the axial bearing 136, on the housing of the caliper 104 in a parking brake state.

Once the brake piston 120 is axially supported, the hydraulic pressure in the cavity 126 can be removed. The parking brake state is maintained because of the position of the spindle nut 128 and because of self-arresting (for example, by a self-arresting transmission between the spindle 134 and the receiver 138). The outboard and inboard brake linings 112 and 116, respectively, pressing against the brake disc 106 are supported via the spindle nut 128.

When the parking brake state is to be released, pressurized hydraulic fluid is again introduced into the cavity 126. As a result, the brake piston 120 is displaced slightly leftward, along the longitudinal axis 142, towards the brake disc 106 such that the spindle nut 128 is relieved of axial load. Through control of the EPB 130, the spindle nut 128 can then be displaced back into the initial axial position illustrated in FIG. 2.

Figure 3:
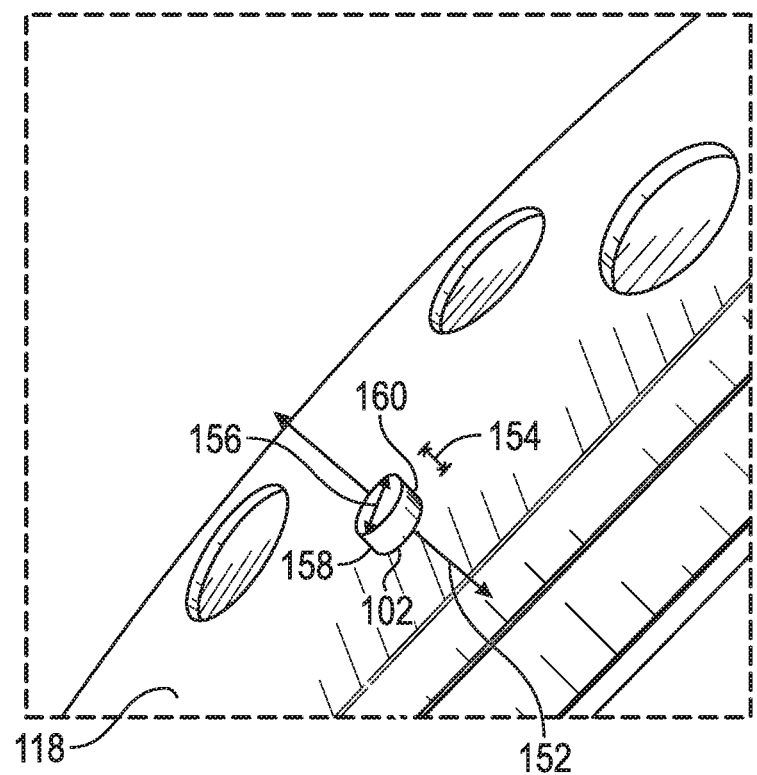
FIG. 3 is a perspective view of the anti-rotation member of the disc brake assembly of FIG. 1.

Referring now to FIG. 3, there is illustrated the pip 102 in detail. The pip 102 is symmetric across a line 152. As illustrated, the pip 102 is a cylinder with a constant height 154 and a constant diameter 156. The pip 102 has first and second stop surfaces 158 and 160, respectively. The first and second stop surfaces 158 and 160, respectively, are each parallel to the axis 142.

Figure 4:
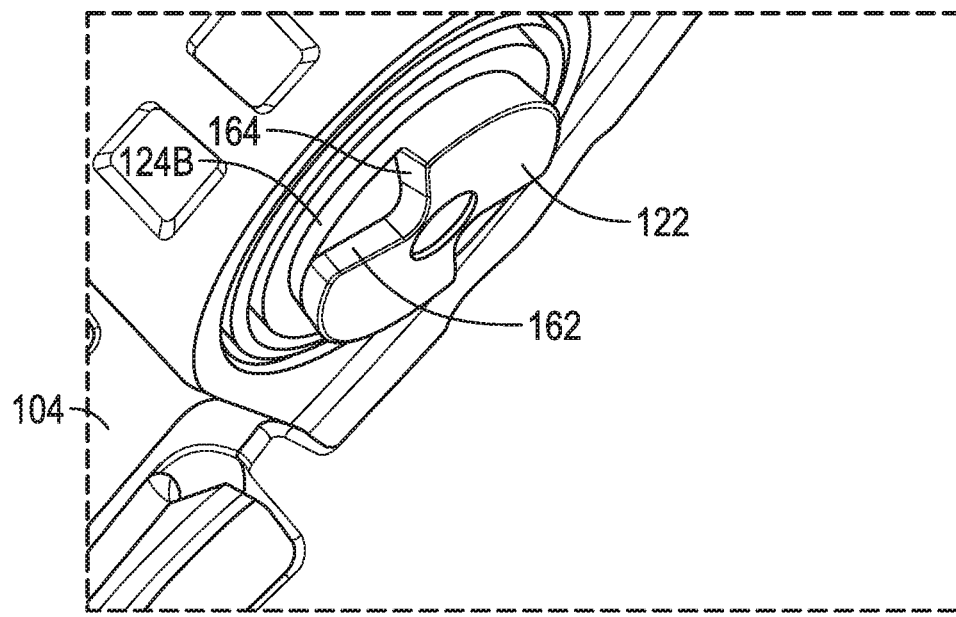
FIG. 4 is a perspective view of an end face of a brake piston of the disc brake assembly of FIG. 1.

Referring now to FIG. 4, there are illustrated the first and second recessed areas 124A and 124B, respectively, in detail. As discussed, the first and second recessed areas 124A and 124B, respectively, are recessed into the end face 122. Each of the first and second recessed areas 124A and 124B, respectively, have first and second contact surfaces 162 and 164, respectively.

Figure 5:
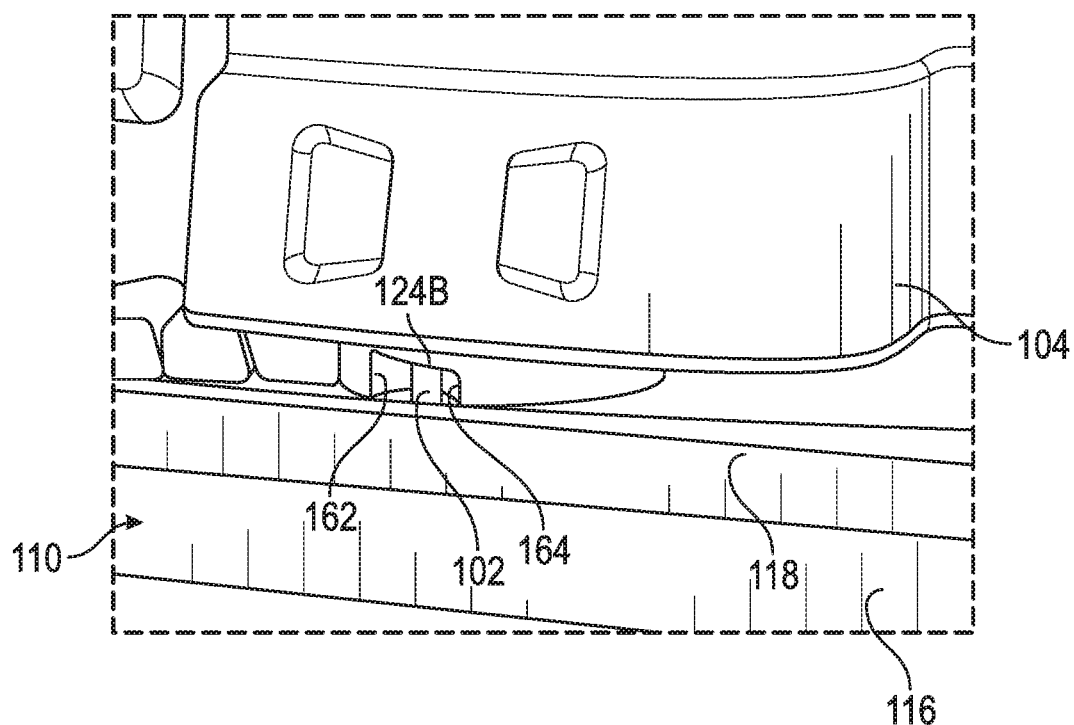
FIG. 5 is a perspective view of the anti-rotation member of FIG. 3 engaged with the end face of FIG. 4.

Referring now to FIG. 5, there is illustrated the first contact surface 162 of the first recessed area 119A in contact with the first stop surface 158. Such occurs when the end face 122 contacts the inboard backing plate 118 when the parking brake function is activated.

Figure 6:
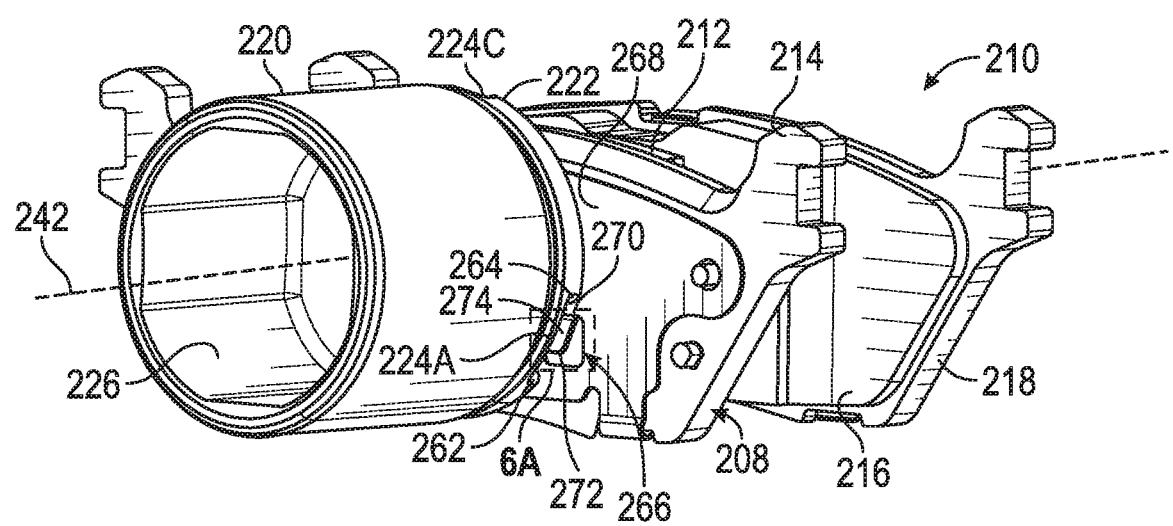
FIG. 6 is a perspective view of an anti-rotation member in accordance with a first embodiment of the present invention.
Figure 7:
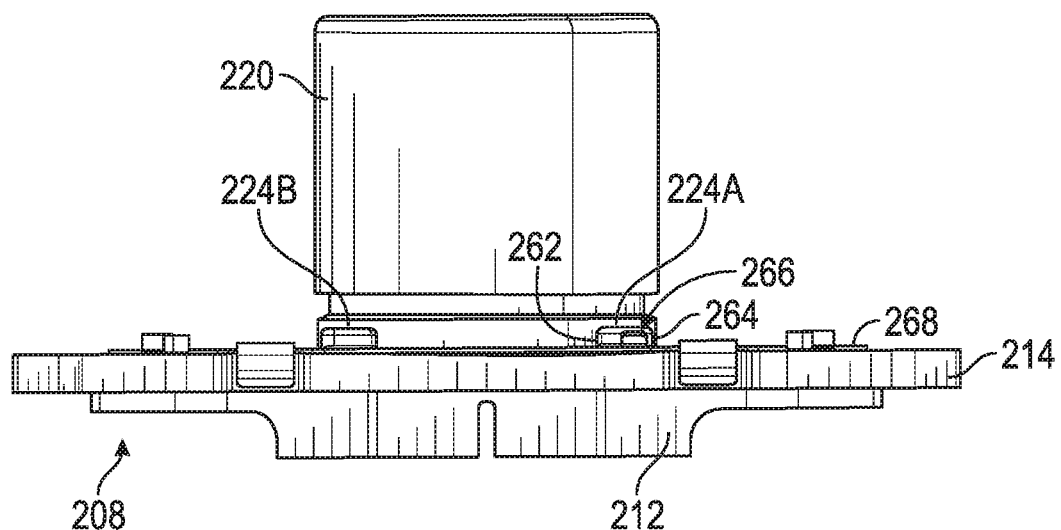
FIG. 7 is a first elevation view of the anti-rotation member of FIG. 6.
Figure 8:
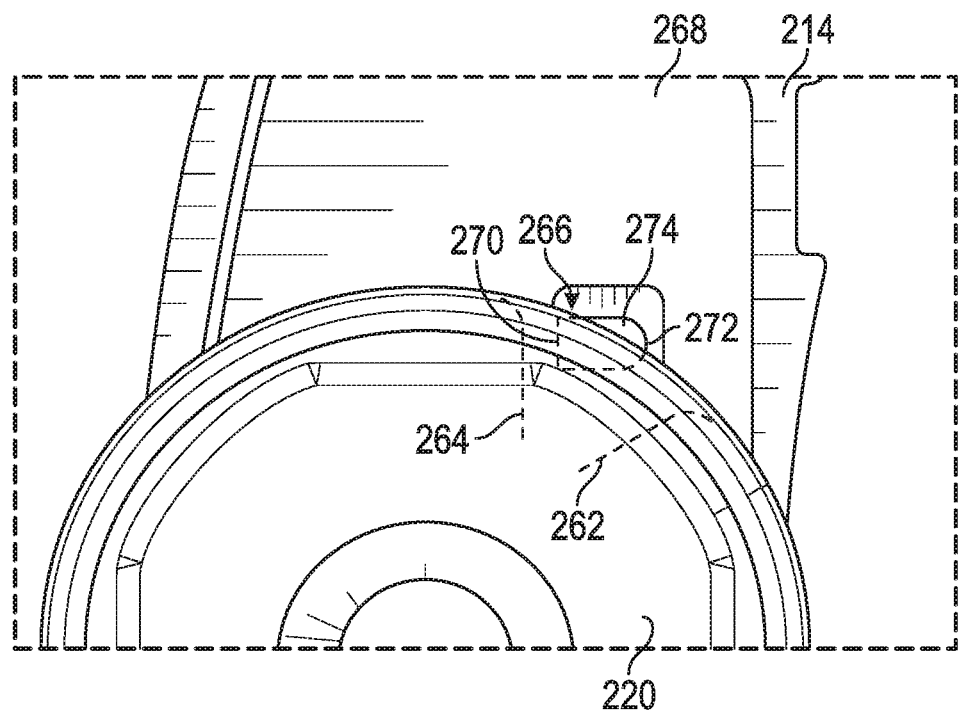
FIG. 8 is a second elevation view of the anti-rotation member of FIG. 6.

Referring now to FIGS. 6-8, there is illustrated an outboard brake shoe, indicated generally at 208, an inboard brake shoe, indicated generally at 210, and a brake piston 220 with an end face 222. The outboard brake shoe 208, the inboard brake shoe 210, the brake piston 220, and the end face 222 are variations of the outboard brake shoe 108, the inboard brake shoe 110, and the brake piston 120 of FIGS. 1-5. As such, like reference numerals, increased by 100, designate corresponding parts in the drawings and detailed description thereof will be omitted.

Also illustrated in FIGS. 6-8 is a first embodiment of an anti-rotation member, indicated generally at 266, produced in accordance with the present invention and for use with a disc brake assembly. As a non-limiting example, the anti-rotation member 266 may be used with the prior art disc brake assembly 100 of FIGS. 1-5 in lieu of the pip 102.

The inboard brake shoe 210 includes a pad noise shim 268 mounted to an inboard backing plate 218. The anti-rotation member 266 extends from the shim 268 and towards the brake piston 220. The anti-rotation member 266 is connected to the shim 268 by a bend portion 270 that biases the anti-rotation member 266 away from the inboard brake shoe 210. The bend portion 270 biases the anti-rotation member 266 to a position shown in FIGS. 6-8.

Preferably, the anti-rotation member 266 is formed as a portion of the shim 268. As non-limiting examples, the anti-rotation member 266 may be stamped or cut from the shim 268. As non-limiting examples, the shim 268 (as well as the anti-rotation member 266) may be fabricated from metallic or plastic material.

The anti-rotation member 266 includes a stop surface 272 and a diversion surface 274. The stop surface 272 forms a first plane that is parallel to a longitudinal axis 242. The diversion surface 274 forms a second plane that is transverse to the longitudinal axis. As a result, the diversion surface 274 is not parallel to the stop surface 272 or the longitudinal axis 242. Instead, the diversion surface 274 is inclined or sloped. Although each of the stop surface 272 and the diversion surface 274 are illustrated and described as planes, such is not necessary. Alternatively, one or both of the stop surface 272 and/or the diversion surface 274 may be other than planar. Non-planar shapes for the anti-rotation member 266 will be discussed with reference to FIGS. 24-26.

Figure 6A:
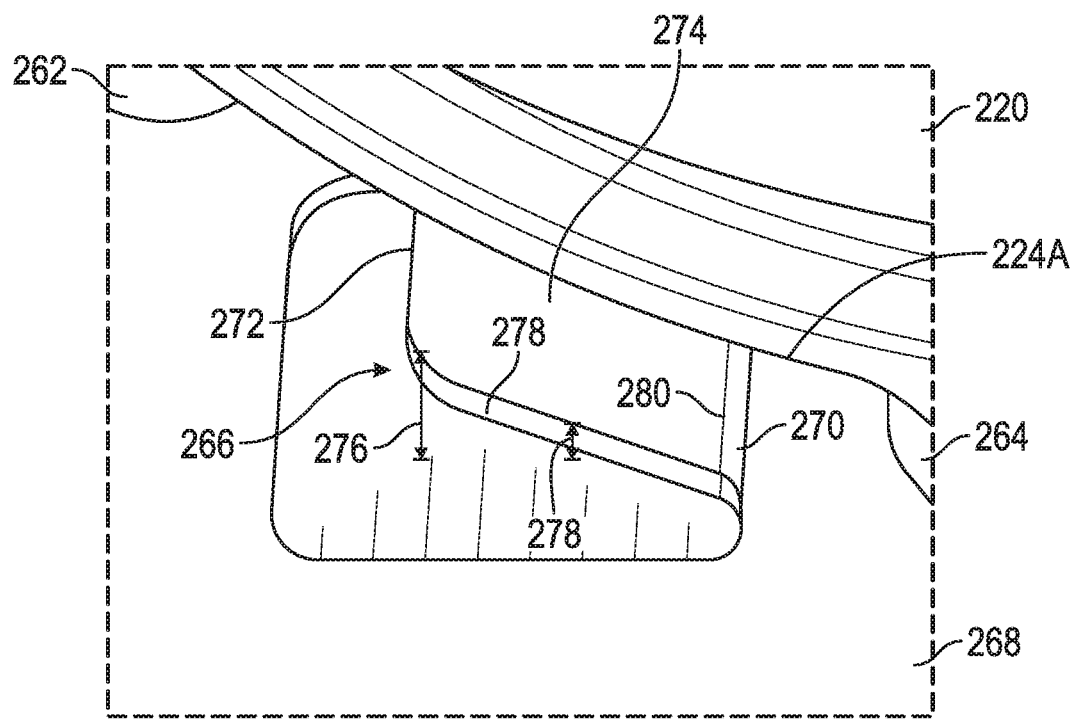
FIG. 6A is an enlarged portion of FIG. 6.

Referring specifically to FIG. 6A, a first distance 276 is from the inboard backing plate 218 to the diversion surface 274 adjacent the stop surface 272. A second distance 278 is from the inboard backing plate 218 to the diversion surface 274 between the first distance 276 and the bend portion 270. The first and second distances 276 and 278, respectively, are parallel to the longitudinal axis 242. The first distance 276 is between the stop surface 272 and the second distance 278. The first distance 276 is greater than the second distance 278. Preferably, when the second distance 278 is at an end 280 of the diversion surface 274 opposite the stop surface 272, the second distance 278 is zero. Preferably, the first distance 276 is measured along the axis 242 at a furthest extent of the anti-rotation member 266 from the inboard brake shoe 110.

Figure 9:
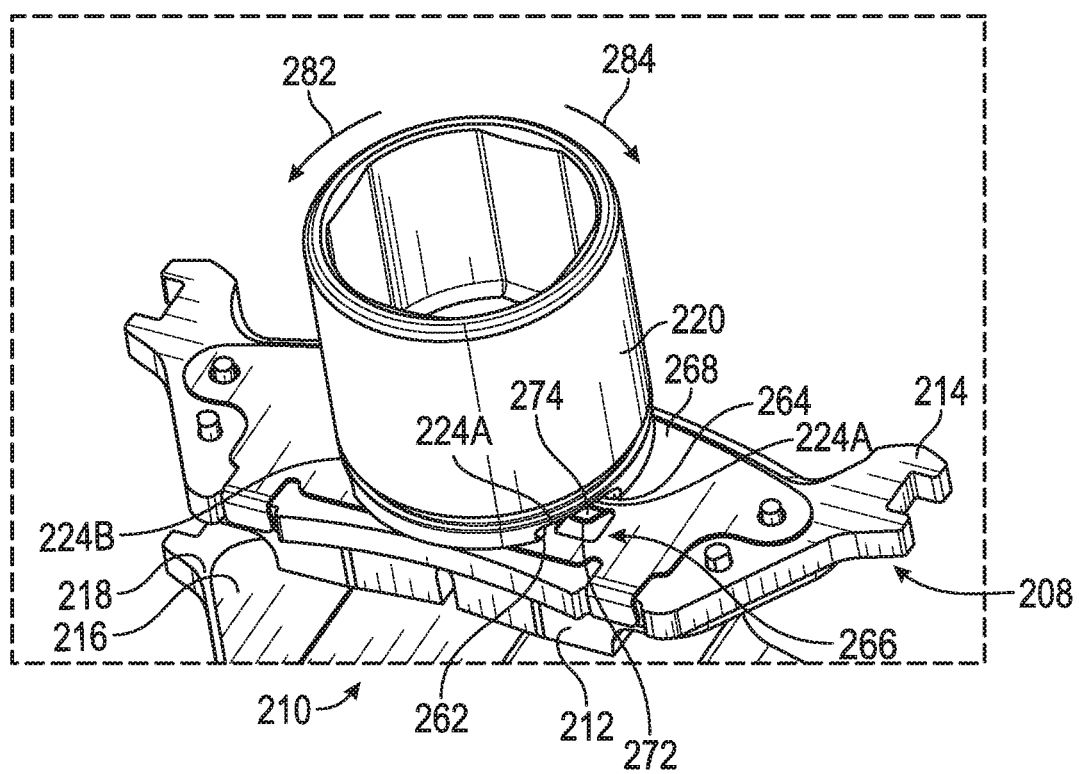
FIG. 9 is a perspective view of the anti-rotation member of FIG. 6 in a first operating position.

Referring now to FIG. 9, there is illustrated a first operating position of the anti-rotation member 266. In the first operating position, the brake piston 220 has contacted the shim 268. Neither first nor second contact surfaces 262 or 264, respectively, of a first recessed area 224A are engaged with the anti-rotation member 266. As a result, the brake piston 220 is free to rotate in first or second directions 282 or 284, respectively. When rotating in the first direction 282, the brake piston 220 displaces to support the inboard brake shoe 210. When rotating in the second direction 284, the brake piston 220 displaces away from the inboard brake shoe 210.

Figure 10:
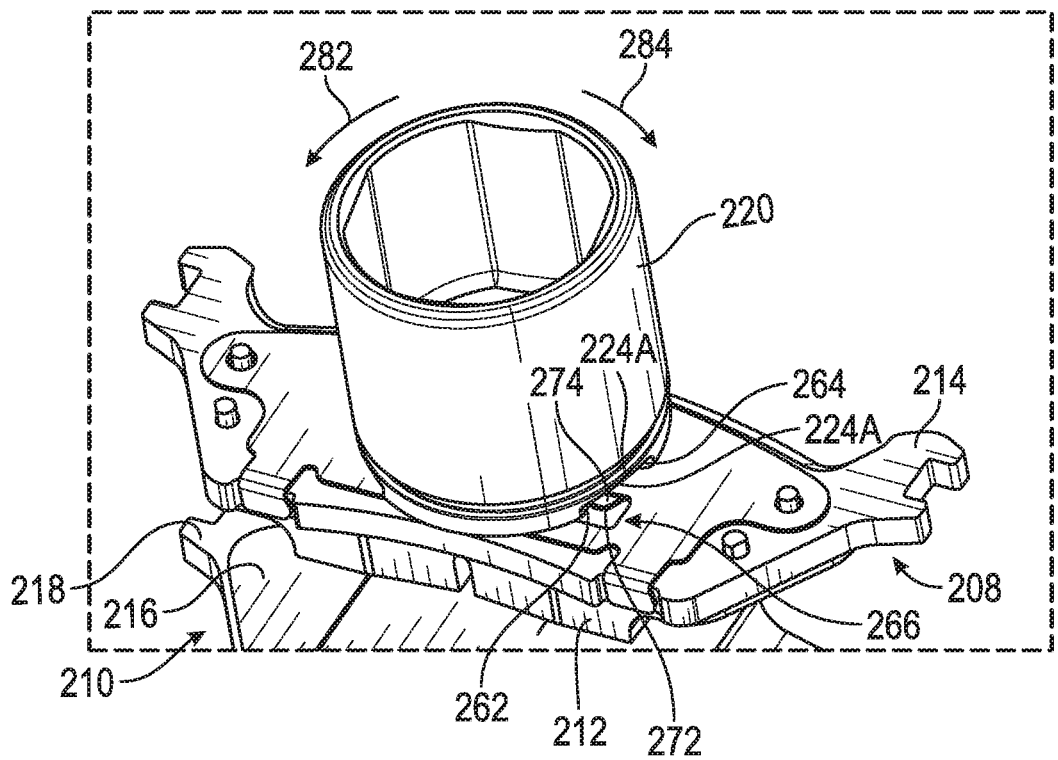
FIG. 10 is a perspective view of the anti-rotation member of FIG. 6 in a second operating position.

Referring now to FIG. 10, there is illustrated a second operating position of the anti-rotation member 266. In the second operating position, the brake piston 220 remains in contact with the shim 268. The brake piston 220 has rotated in the first direction 282 until the first contact surface 262 has engaged the stop surface 272. When the first contact surface 262 engages the stop surface 272, further rotation of the brake piston 220 in the first direction 282 is positively prevented. The first contact surface 262 engaging the stop surface 272 stops the brake piston 220 from rotation in the first direction 276.

Figure 11:
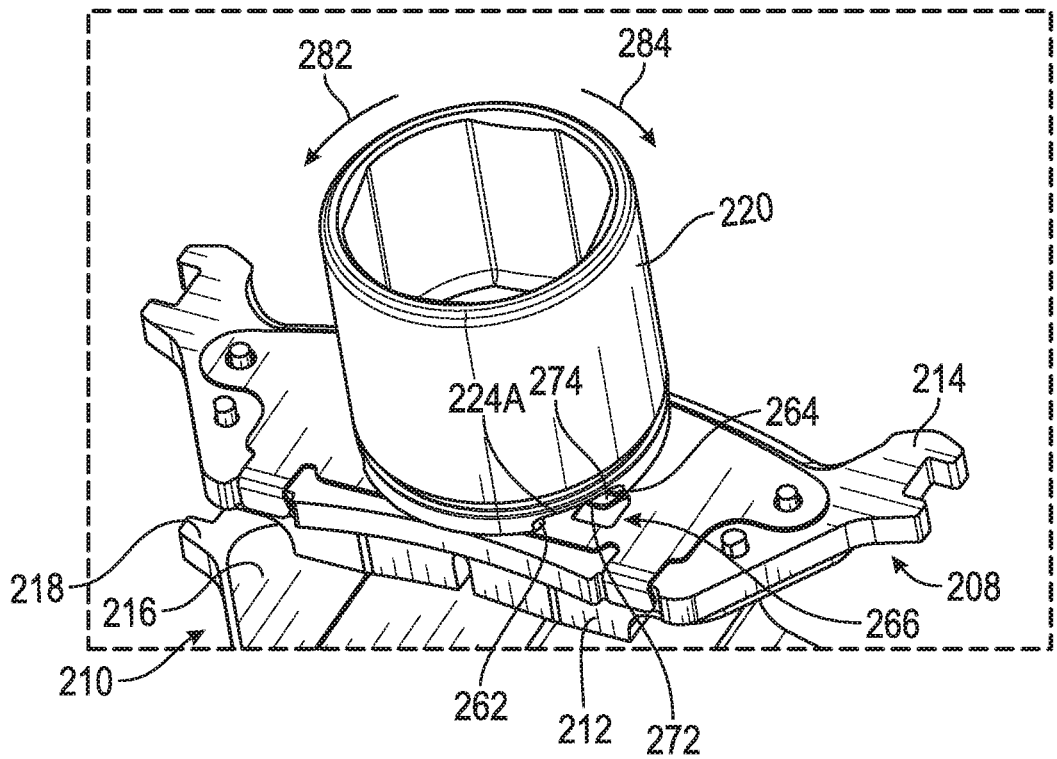
FIG. 11 is a perspective view of the anti-rotation member of FIG. 6 in a third operating position.
Figure 12:
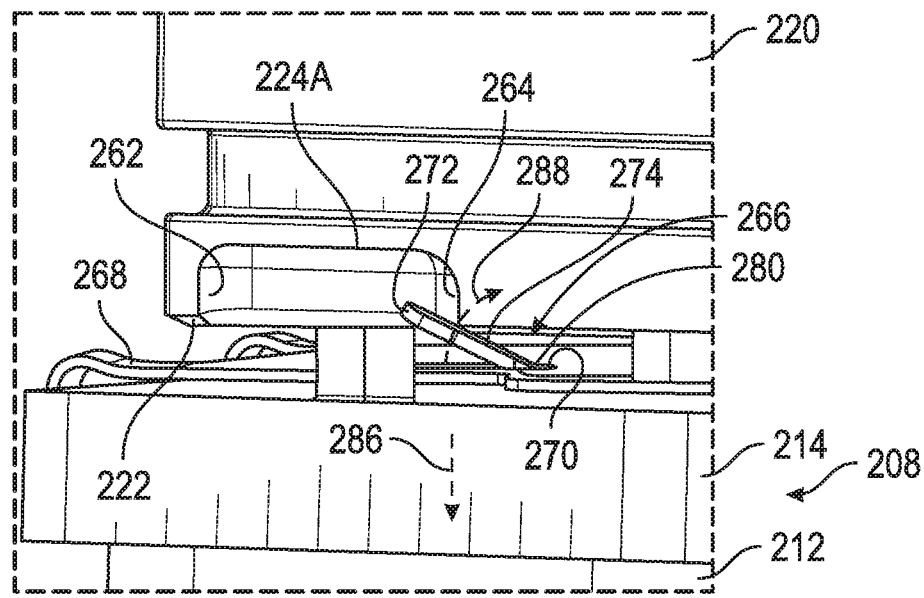
FIG. 12 is an elevation view of the anti-rotation member of FIG. 6 in the third operating position.

Referring now to FIGS. 11 and 12, there is illustrated a third operating position of the anti-rotation member 266. In the third operating position, the brake piston 220 continues to be in contact with the shim 268. The brake piston 220 has now rotated in the second direction 284 until the second contact surface 264 has engaged the diversion surface 274. When the second contact surface 264 engages the diversion surface 274, further rotation of the brake piston 220 in the second direction 284 is allowed.

Continued rotation of the brake piston 220 in the second direction 284 when the second contact surface 264 engages the diversion surface 274 is because the anti-rotation member 266 deflects in a deflection direction 286 towards the inboard brake shoe 210. Specifically, the diversion surface 274 deflects in the deflection direction 286 by rotating about the bend portion 270. The stop surface 272 is rigidly connected to the diversion surface 274 such that the stop surface 272 also deflects in the deflection direction 286 when the second contact surface 264 engages the diversion surface 274.

The deflection of the anti-rotation member 266 in the deflection direction 286 is against a spring force 288. The spring force 288 biases the anti-rotation member 266 to the position illustrated in FIG. 9 when the second contact surface 264 disengages—or is otherwise not engaged with— the diversion surface 274. The spring force 288 returns the diversion surface 274 away from the inboard brake shoe 210 when the second contact surface 264 disengages from the diversion surface 274. The spring force 288 is generated by the bend portion 270.

The anti-rotation member 266 need not progress through the first, second, and third operating positions in numerical order. The anti-rotation member 266 typically changes between the first operating position and the second or third operating position. The anti-rotation member 266 changes between the second and third operating positions through the first operating position.

Figure 13:
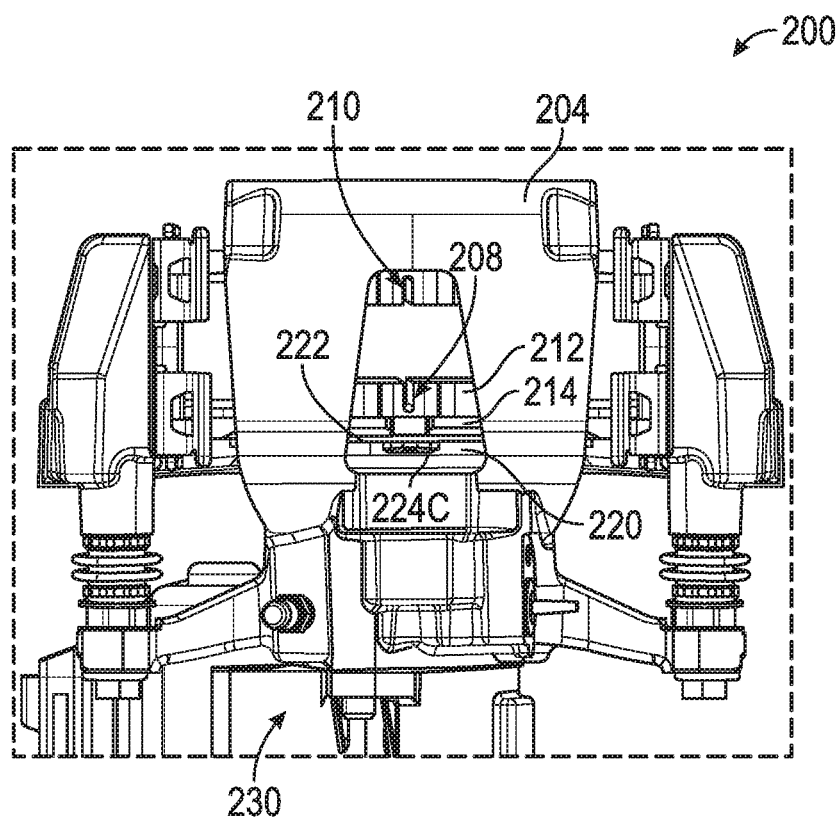
FIG. 13 is a first elevation view of a disc brake assembly having the anti-rotation member of FIG. 6.
Figure 14:
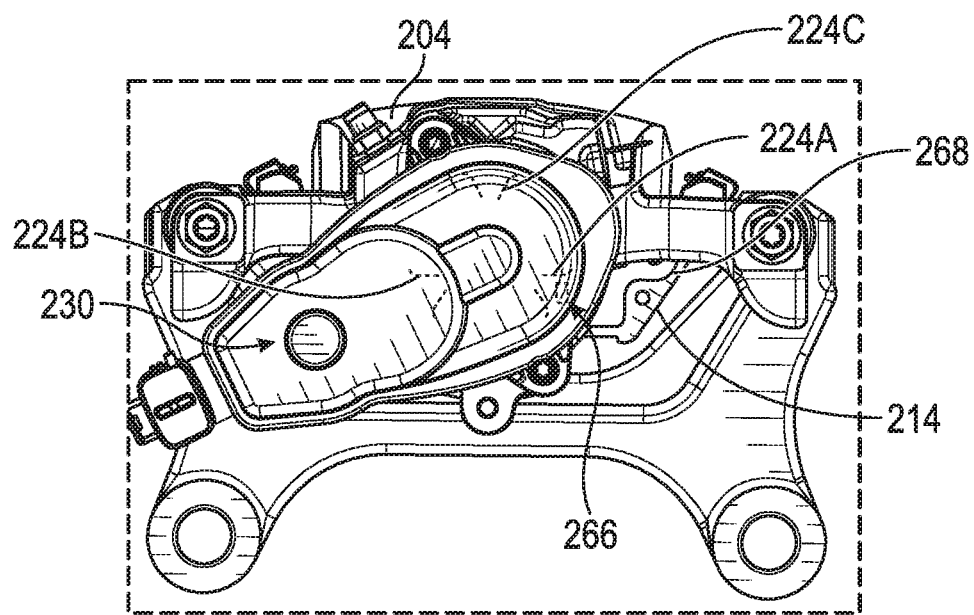
FIG. 14 is a second elevation view of the disc brake assembly of FIG. 13.
Figure 15:
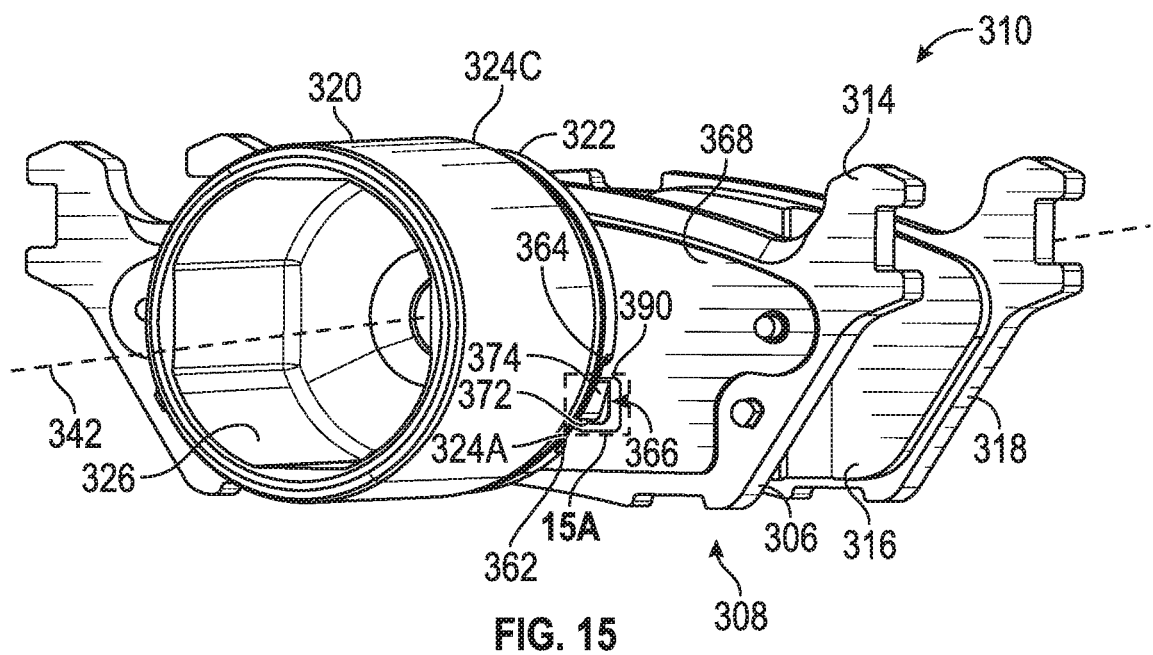
FIG. 15 is a perspective view of an anti-rotation member in accordance with a second embodiment of the present invention.
Figure 15A:
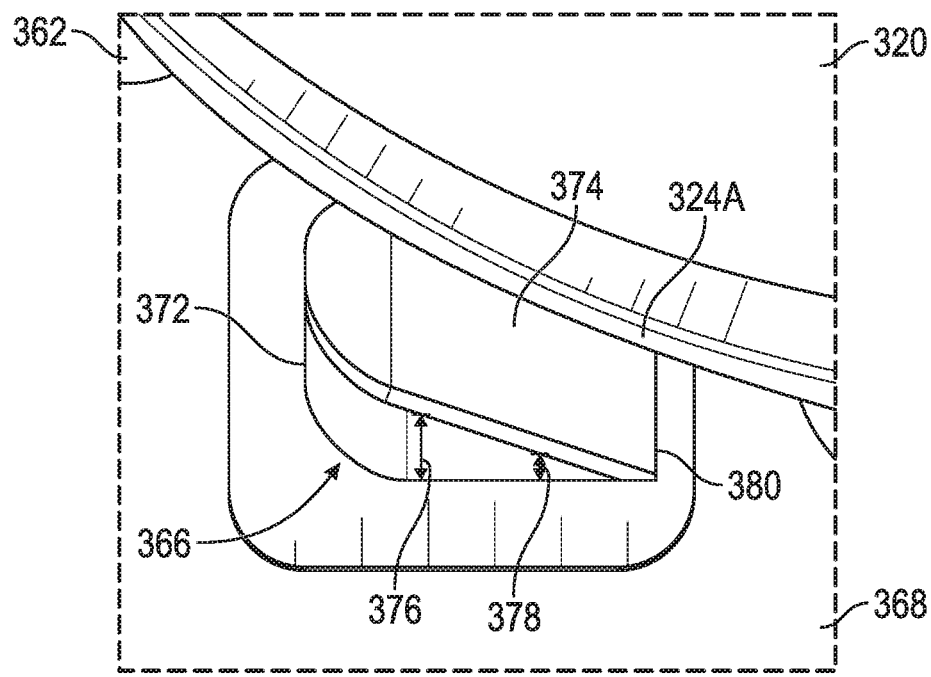
FIG. 15A is an enlarged portion of FIG. 15.
Figure 16:
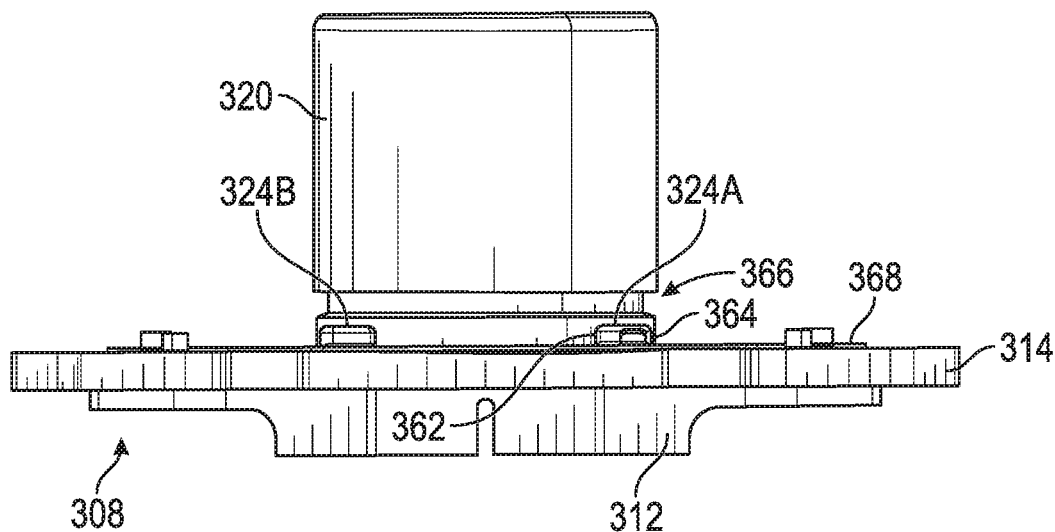
FIG. 16 is a first elevation view of the anti-rotation member of FIG. 15.
Figure 17:
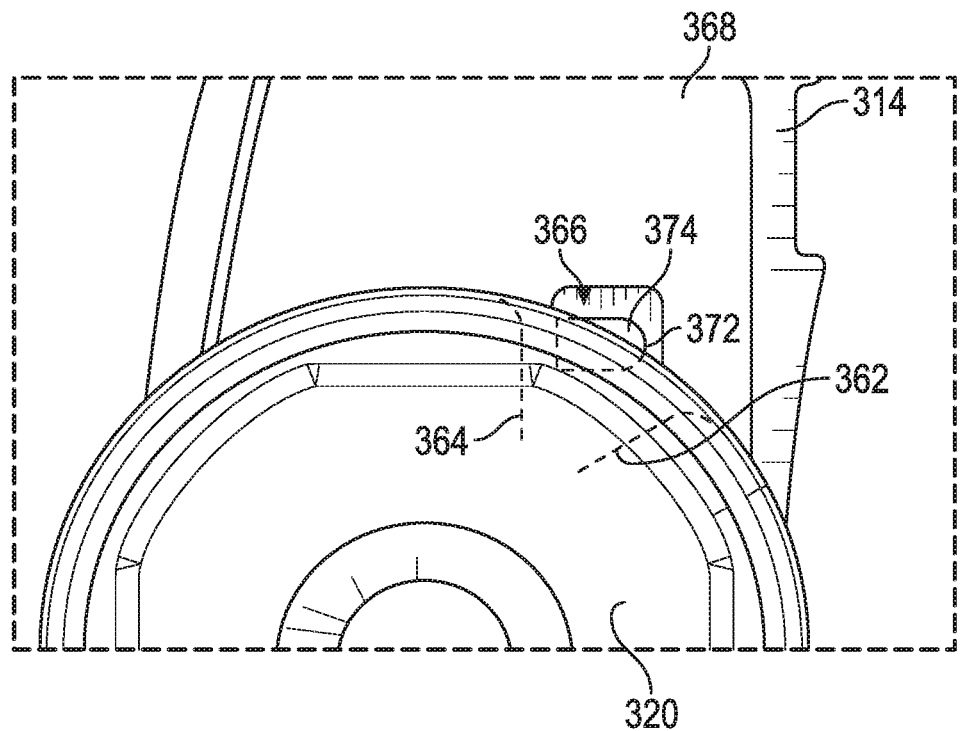
FIG. 17 is a second elevation view of the anti-rotation member of FIG. 15.
Figure 18:
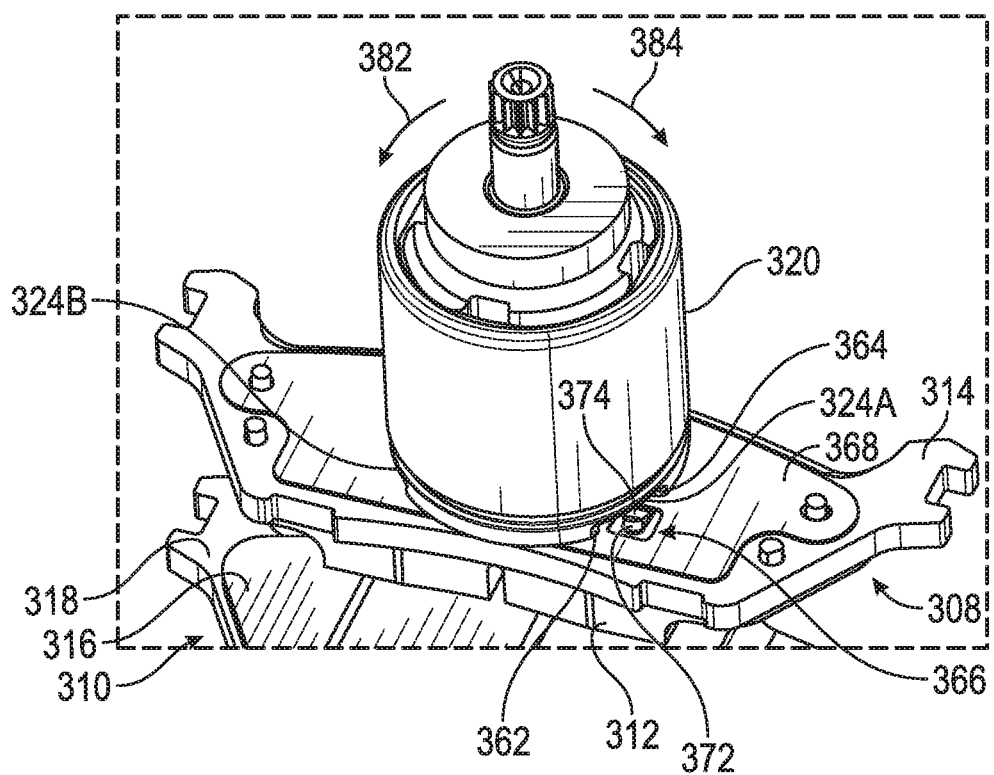
FIG. 18 is a perspective view of the anti-rotation member of FIG. 15 in a first operating position.
Figure 19:
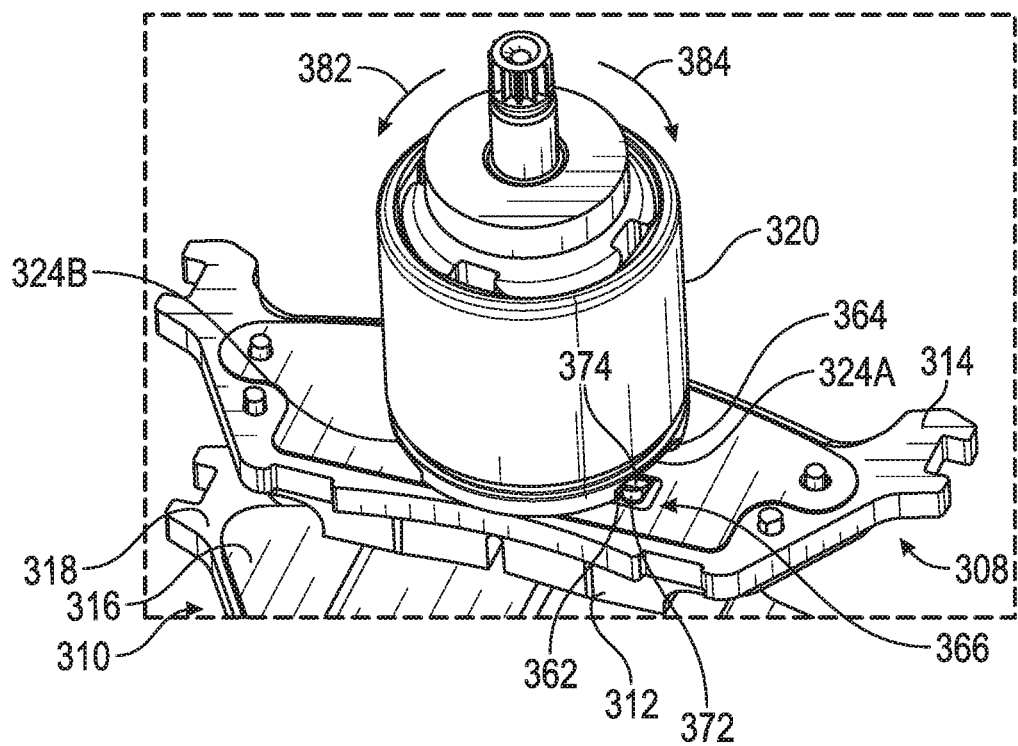
FIG. 19 is a perspective view of the anti-rotation member of FIG. 15 in a second operating position.

Referring now to FIGS. 13 and 14, there is illustrated alignment of the anti-rotation member 266 and the first recessed area 224A. Also illustrated are positions of second and third recessed areas 224B and 224C, respectively. In FIGS. 13 and 14, the inboard brake shoe 110 and the brake piston 220 are positioned relative to each other for manufacturing of a disc brake assembly, indicated generally at 200.

The anti-rotation member 266 has been described for a disc brake assembly that is provided with an electric parking brake. Alternatively, the anti-rotation member 266 may be provided for a disc brake assembly with the electric parking brake omitted.

Referring now to FIGS. 15-23, there is illustrated a second embodiment of an anti-rotation member, indicated generally at 366, produced in accordance with the present invention and for use with a disc brake assembly. As a non-limiting example, the anti-rotation member 366 may be used with the prior art disc brake assembly 100 of FIGS. 1-5 in lieu of the pip 102. It will be appreciated that this invention may be used in connection with other types or kinds of disc brake assemblies, if so desired.

The anti-rotation member 366 is illustrated with an outboard brake shoe, indicated generally at 308, an inboard brake shoe, indicated generally at 310, and a brake piston 320 with an end face 322. The outboard brake shoe 308, the inboard brake shoe 310, and the brake piston 320 are variations of the outboard brake shoe 208, the inboard brake shoe 210, the brake piston 220, and the end face 222 of FIGS. 6-14. As such, like reference numerals, increased by 100, designate corresponding parts in the drawings and detailed description thereof will be omitted.

The inboard brake shoe 308 includes an inboard backing plate 318. The anti-rotation member 366 extends from the inboard backing plate 318 and towards the brake piston 320. As illustrated, the anti-rotation member 366 extends through an opening 390 in a pad noise shim 368. The anti-rotation member 366 is formed from the inboard backing plate 318 and thus is rigidly positioned relative to the inboard backing plate 318. Preferably, the anti-rotation member 366 is monolithically formed with the inboard backing plate 318 when the inboard backing plate 318 is cast. Alternatively, the anti-rotation member 366 may be other than monolithically formed with the inboard backing plate 318. As a non-limiting example, the anti-rotation member 366 may be formed as a separate member that is fixed to the inboard backing plate 318 by a suitable means.

Figure 20:
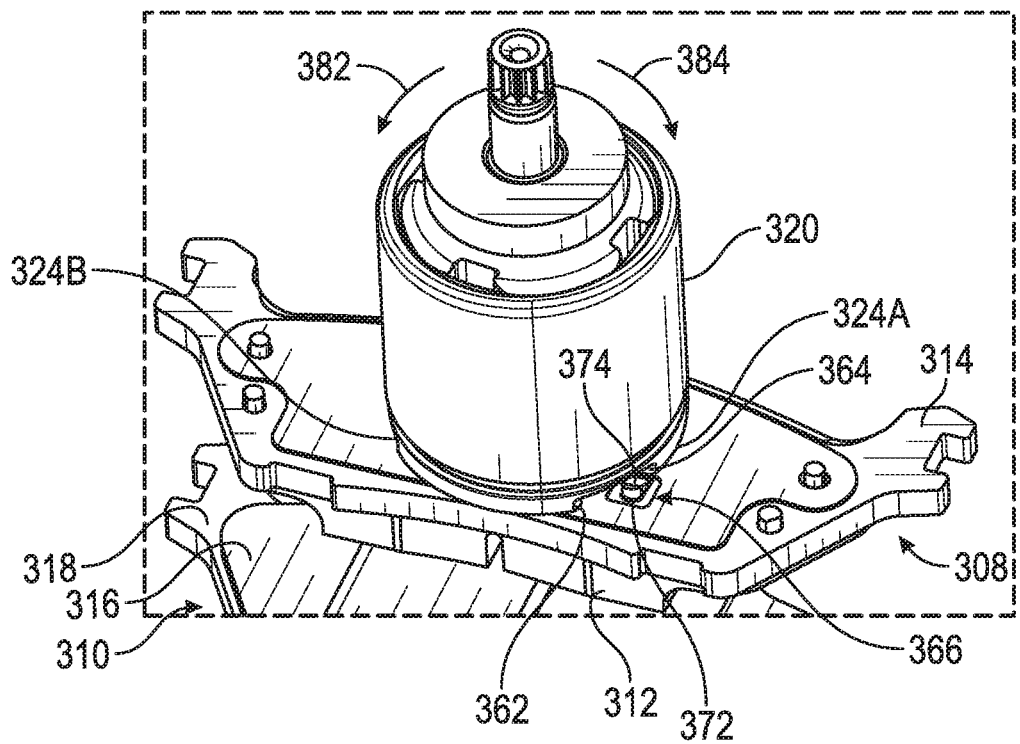
FIG. 20 is a perspective view of the anti-rotation member of FIG. 15 in a third operating position.
Figure 21:
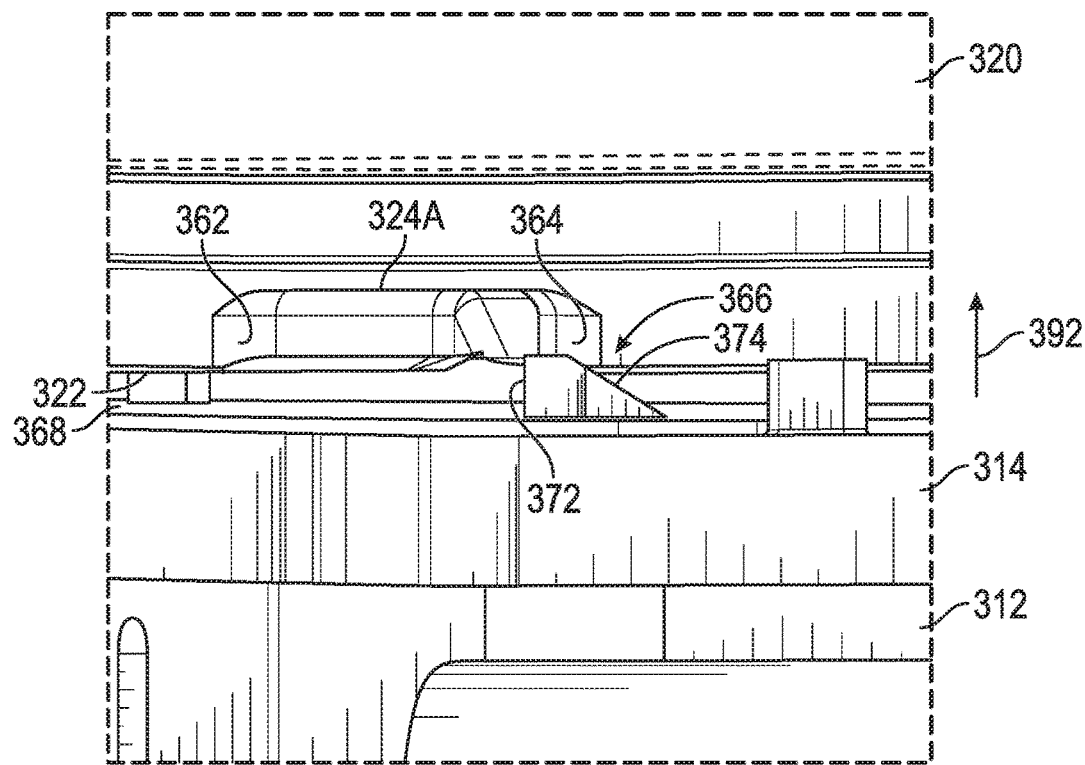
FIG. 21 is an elevation view of the anti-rotation member of FIG. 15 in the third operating position.
Figure 22:
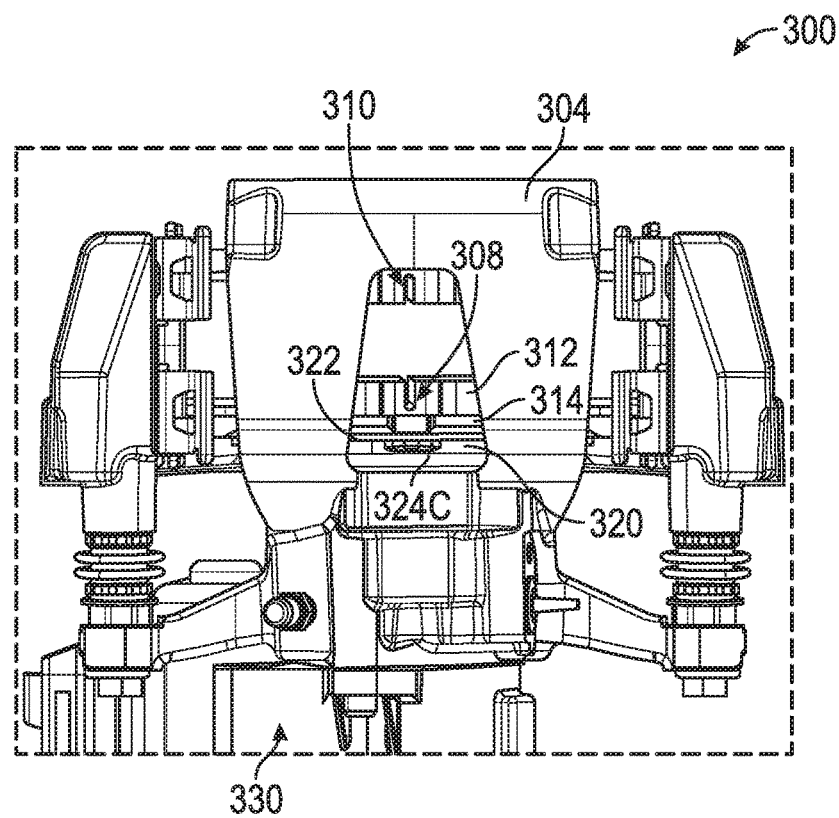
FIG. 22 is a first elevation view of a disc brake assembly having the anti-rotation member of FIG. 15.
Figure 23:
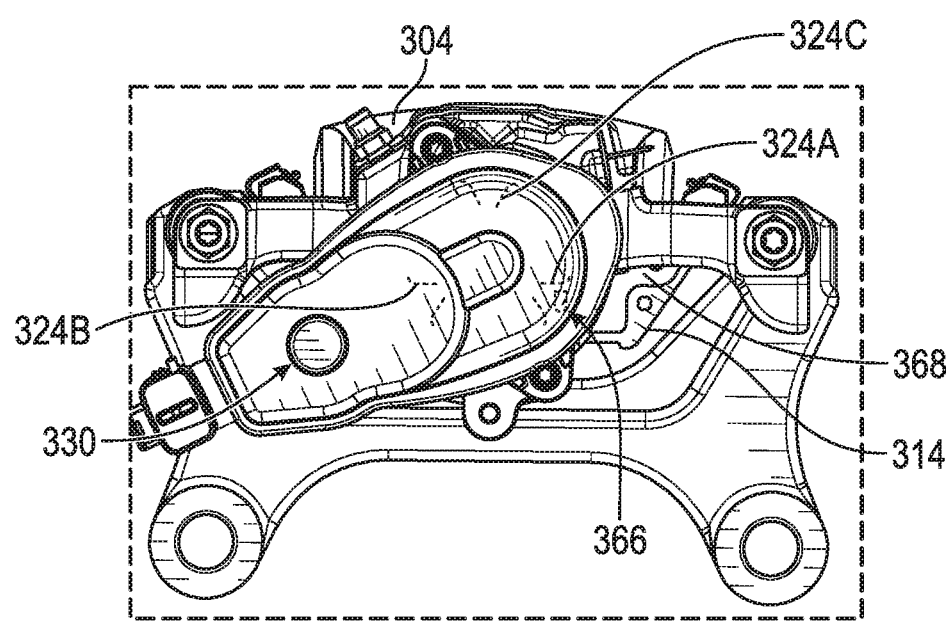
FIG. 23 is a second elevation view of the disc brake assembly of FIG. 22.

Referring specifically to FIGS. 20 and 21, in a third operating position, a second contact surface 364 of a first recessed area 324A has engaged a diversion surface 374 of the anti-rotation member 366. When the second contact surface 364 has engaged the diversion surface 374, the brake piston 320 continues to rotate in a second direction 384. As the brake piston 320 continues to rotate in the second direction 384, the second contact surface 364 translates up—i.e., "rides up"—the diversion surface 374. When the second contact surface 364 translates up the diversion surface 374, the brake piston 320 displaces along a longitudinal axis 342 in a displacement direction 392. The brake piston 320 is able to displace along the longitudinal axis 342 because, during servicing, a spindle nut (e.g., the spindle nut 128 in FIG. 1) is pulled away from a conical inner portion (e.g., the conical inner portion 148 in FIG. 1) by a spindle screw. This increases a clearance between the spindle nut and the conical inner portion (e.g., the clearance 150 in FIG. 2). The increased clearance allows the brake piston 320 to be displaced when the piston brake 320 rides up the diversion surface 374.

Figure 24:
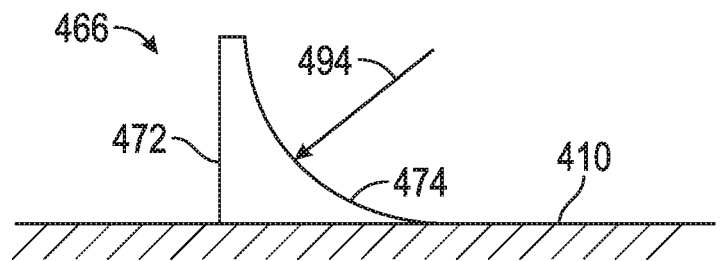
FIG. 24 is an elevation view of an anti-rotation member in accordance with a third embodiment of the present invention.

Referring now to FIG. 24, there is illustrated a third embodiment of an anti-rotation member, indicated generally at 466, produced in accordance with the present invention. The anti-rotation member 466 is a variation of the anti-rotation member 366 of FIGS. 15-23. As such, like reference numerals, increased by 100, designate corresponding parts in the drawings and detailed description thereof will be omitted.

A diversion surface 474 is non-planar—i.e., curved—and has a constant radius 494. As illustrated, the diversion surface 474 is a concave surface. Alternatively, the diversion surface 474 may be a convex surface. Alternatively, the diversion surface 474 may be a combination of concave and convex surfaces.

Figure 25:
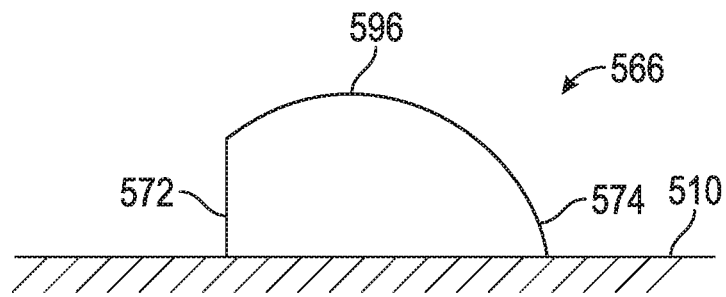
FIG. 25 is an elevation view of an anti-rotation member in accordance with a fourth embodiment of the present invention.

Referring now to FIG. 25, there is illustrated a fourth embodiment of an anti-rotation member, indicated generally at 566, produced in accordance with the present invention. The anti-rotation member 566 is a variation of the anti-rotation member 366 of FIGS. 15-23. As such, like reference numerals, increased by 200, designate corresponding parts in the drawings and detailed description thereof will be omitted.

A diversion surface 574 is non-planar—i.e., curved—and has an apex 596. As such, a first distance 576 is offset or otherwise separated from a stop surface 572.

Figure 26:
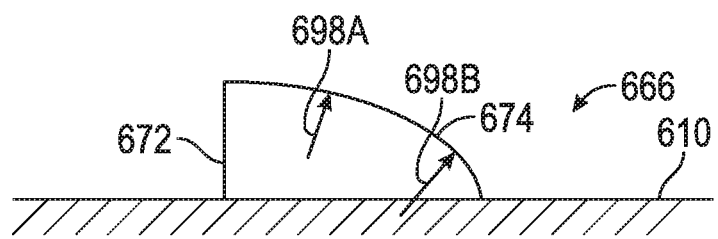
FIG. 26 is an elevation view of an anti-rotation member in accordance with a fifth embodiment of the present invention.

Referring now to FIG. 26, there is illustrated a fifth embodiment of an anti-rotation member, indicated generally at 666, produced in accordance with the present invention. The anti-rotation member 666 is a variation of the anti-rotation member 666 of FIGS. 15-23. As such, like reference numerals, increased by 300, designate corresponding parts in the drawings and detailed description thereof will be omitted.

A diversion surface 674 is non-planar—i.e., curved—and has a varying radius. As a non-limiting example, the diversion surface 674 has a first radius 698A and a second radius 698B, wherein the first radius 698A is greater than the second radius 698B.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:
1. A disc brake assembly comprising:
a brake shoe displaceable along an axis;
an anti-rotation member extending outward from the brake shoe and having a stop surface and a diversion surface;
a displaceable brake piston that supports the brake shoe;
an end face of the brake piston perpendicular to the axis and facing the brake shoe; and
a recessed area in the end face, wherein the recessed area engages the stop surface to stop rotation of the brake piston in a first direction, the recessed area engages the diversion surface to allow rotation of the brake piston in a second direction, and the first and second directions are opposite, the diversion surface deflecting towards the brake shoe when engaged by the recessed area.

2. The disc brake assembly of claim 1 wherein a spring force returns the diversion surface away from the brake shoe when the recessed area disengages the diversion surface.

3. The disc brake assembly of claim 1 wherein the stop surface deflects with the diversion surface.

4. The disc brake assembly of claim 1 wherein the anti-rotation member deflects towards the brake shoe when the diversion surface is engaged by the recessed area.

5. The disc brake assembly of claim 1 wherein the anti-rotation member is connected to the brake shoe by a bend portion that biases the anti-rotation member away from the brake shoe.

6. The disc brake assembly of claim 1 further comprising:
a first distance from the brake shoe to the diversion surface; and
a second distance from the brake shoe to the diversion surface, the first and second distances are parallel to the axis, the first distance is greater than the second distance, and the first distance is between the stop surface and the second distance.

7. The disc brake assembly of claim 1 wherein the stop surface is a first plane parallel to the axis and the diversion surface is a second plane transverse to the axis.

8. The disc brake assembly of claim 1 wherein the diversion surface is a curved surface.

9. The disc brake assembly of claim 1 wherein the diversion surface has a varying radius.

10. The disc brake assembly of claim 1 wherein the anti-rotation member extends from a backing plate of the brake shoe.

11. The disc brake assembly of claim 1 wherein the anti-rotation member extends from a shim of the brake shoe.

12. The disc brake assembly of claim 1 wherein the recessed area is recessed into the end face away from the brake shoe.

13. The disc brake assembly of claim 1 wherein rotation of the brake piston in the first direction positions the brake piston to support the brake shoe and rotation of the brake piston in the second direction displaces the brake piston away from the brake shoe.

14. The disc brake assembly of claim 1 further comprising:
   a spindle nut displaceable along the axis to support the brake piston on the brake shoe;
   a spindle upon which the spindle nut is threaded; and
   a drive assembly that rotates the spindle to displace the spindle nut along the axis.

15. A disc brake assembly comprising:
   a brake shoe displaceable along an axis;
   an anti-rotation member extending outward from the brake shoe and having a stop surface and a diversion surface;
   a displaceable brake piston that supports the brake shoe;
   an end face of the brake piston perpendicular to the axis and facing the brake shoe; and
   a recessed area in the end face, wherein the recessed area engages the stop surface to stop rotation of the brake piston in a first direction, the recessed area engages the diversion surface to allow rotation of the brake piston in a second direction, the first and second directions are opposite, and the anti-rotation member deflects towards the brake shoe when the diversion surface is engaged by the recessed area.

16. The disc brake assembly of claim 15 wherein the anti-rotation member is biased away from the brake shoe.

17. A disc brake assembly comprising:
   a caliper having a cavity;
   inboard and outboard brake shoes displaceable along an axis;
   brake linings mounted to the inboard and outboard brake shoes;
   a brake piston mounted in the cavity for displacing the inboard and outboard brake shoes and supporting the inboard brake shoe;
   an end face of the brake piston perpendicular to the axis and facing the inboard brake shoe;
   a recessed area in the end face; and
   an anti-rotation member extending outward from the inboard brake shoe and having a stop surface and a diversion surface, wherein the recessed area engages the stop surface to stop rotation of the brake piston in a first direction, the recessed area engages the diversion surface to allow rotation of the brake piston in a second direction, and the first and second directions are opposite, the diversion surface deflecting towards the inboard brake shoe when engaged by the recessed area.

18. The disc brake assembly of claim 17 further comprising:
   a spindle nut displaceable along the axis to support the brake piston on the inboard brake shoe;
   a spindle upon which the spindle nut is threaded; and
   a drive assembly that rotates the spindle to displace the spindle nut along the axis.

* * * * *